US010179436B2

(12) United States Patent
Mantell et al.

(10) Patent No.: US 10,179,436 B2
(45) Date of Patent: Jan. 15, 2019

(54) METHOD FOR USING OPTICAL SENSOR FOCUS TO IDENTIFY FEATURE HEIGHTS ON OBJECTS BEING PRODUCED IN A THREE-DIMENSIONAL OBJECT PRINTER

(71) Applicant: Xerox Corporation, Norwalk, CT (US)

(72) Inventors: David A. Mantell, Rochester, NY (US); David C. Craig, Pittsford, NY (US); Jonathan B. Hunter, Marion, NY (US); Douglas E. Proctor, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 15/966,458

(22) Filed: Apr. 30, 2018

(65) Prior Publication Data

US 2018/0244035 A1 Aug. 30, 2018

Related U.S. Application Data

(62) Division of application No. 14/840,984, filed on Aug. 31, 2015, now Pat. No. 10,005,229.

(51) Int. Cl.

| | |
|---|---|
| ***H04N 1/00*** | (2006.01) |
| ***H04N 1/03*** | (2006.01) |
| ***B29C 64/00*** | (2017.01) |
| ***B29C 64/20*** | (2017.01) |
| ***B29C 64/40*** | (2017.01) |
| ***B33Y 10/00*** | (2015.01) |
| ***B33Y 30/00*** | (2015.01) |

(Continued)

(52) U.S. Cl.

CPC ............ *B29C 64/386* (2017.08); *B29C 64/00* (2017.08); *B29C 64/112* (2017.08); *B29C 64/20* (2017.08); *B29C 64/40* (2017.08); *B33Y 50/02* (2014.12); *H04N 1/00827* (2013.01); *H04N 1/02805* (2013.01); *H04N 1/02895* (2013.01); *H04N 1/03* (2013.01); *B33Y 10/00* (2014.12); *B33Y 30/00* (2014.12); *B33Y 50/00* (2014.12); *G01B 11/00* (2013.01)

(58) Field of Classification Search

CPC ... H04N 1/00827; B33Y 50/00; B29C 64/386
See application file for complete search history.

(56) References Cited

U.S. PATENT DOCUMENTS 5,477,154 A 12/1995 Takahashi et al.
5,917,332 A 6/1999 Chen et al.

(Continued)

OTHER PUBLICATIONS

S. R. Daniel; Depth Extraction by Focal/Aperture Variation; 1990; pp. 281-284; www.bmva.org/bmvc/1990/bmvc-90-050.

(Continued)

*Primary Examiner* — Benjamin A Schiffman
(74) *Attorney, Agent, or Firm* — Maginot Moore & Beck LLP

(57) ABSTRACT

A three-dimensional object printer generates image data of an object being formed in the printer with an optical sensor and identifies the heights of object features above a substrate on which the object is being formed. A controller operates one or more actuators to move the optical sensor at a plurality of distances above the object to generate image data of the object at a plurality of heights above the object. The controller identifies the distances of the features of the object with reference to the image data generated by the optical sensor and the focal length of the optical sensor.

16 Claims, 3 Drawing Sheets

(51) Int. Cl.

| | |
|---|---|
| ***B33Y 50/00*** | (2015.01) |
| ***B33Y 50/02*** | (2015.01) |
| ***G01B 11/00*** | (2006.01) |
| ***H04N 1/028*** | (2006.01) |
| ***B29C 64/112*** | (2017.01) |
| ***B29C 64/386*** | (2017.01) |

(56) References Cited

U.S. PATENT DOCUMENTS

| | | | |
|---|---|---|---|
| 6,173,070 | B1 | 1/2001 | Michael et al. |
| 6,377,865 | B1 | 4/2002 | Edelsbrunner et al. |
| 6,763,141 | B2 | 7/2004 | Xu et al. |
| 7,047,151 | B2 | 5/2006 | Chang |
| 7,457,455 | B2 | 11/2008 | Matsui et al. |
| 8,368,964 | B2 | 2/2013 | Xu et al. |
| 8,837,026 | B2 | 9/2014 | Fisker et al. |
| 9,079,440 | B1 | 7/2015 | Bonino et al. |
| 9,079,441 | B1 | 7/2015 | Giacobbi et al. |
| 9,302,519 | B1 | 4/2016 | Clark et al. |
| 9,327,537 | B2 | 5/2016 | Conrow et al. |
| 9,352,572 | B2 | 5/2016 | Derleth et al. |
| 9,415,546 | B2 | 8/2016 | Conrow et al. |
| 2007/0268540 | A1 | 11/2007 | Gaspardo et al. |
| 2008/0148803 | A1 | 6/2008 | Skultety-Betz et al. |
| 2008/0275334 | A1 | 11/2008 | Belling |
| 2010/0157312 | A1 | 6/2010 | Van Amstel et al. |
| 2011/0205583 | A1 | 8/2011 | Young et al. |
| 2012/0290259 | A1 | 11/2012 | McAfee et al. |
| 2013/0235037 | A1 | 9/2013 | Baldwin et al. |
| 2014/0240700 | A1 | 8/2014 | Ogawa et al. |
| 2014/0376064 | A1 | 12/2014 | Rosberg et al. |
| 2015/0210011 | A1 | 7/2015 | Conrow et al. |
| 2015/0273857 | A1 | 10/2015 | Derleth et al. |
| 2017/0095978 | A1 | 4/2017 | Juhasz |
| 2017/0095977 | A1 | 8/2017 | Thresh et al. |

OTHER PUBLICATIONS

Schechner et al.; Depth from Defocus vs. Stereo: How Different Really Are They?; International Journal of Computer Vision; Sep. 2000; pp. 141-162; vol. 39, Issue No. 2; Kluwer Academic Publishers.

Denkowski et al; Estimating 3D Surface Depth Based on Depth-of-Field Image Fusion; INTECH; Jan. 12, 2011; 17 Pages; www.intechopen.com.

Xu et al; On the Use of Depth-From-Focus in 3D Object Modelling From Multiple Views; University of Illinois at Urbana-Champaign; 6 Pages; Urbana, IL, USA.

Watanabe et al; Real-time computation of depth from defocus; Jan. 1996; 12 Pages.

Johnson et al; Microgeometry Capture using an Elastomeric Sensor; Massachusetts Insitute of Technology; Aug. 7, 2011; 8 Pages.

METHOD FOR USING OPTICAL SENSOR FOCUS TO IDENTIFY FEATURE HEIGHTS ON OBJECTS BEING PRODUCED IN A THREE-DIMENSIONAL OBJECT PRINTER

PRIORITY CLAIM

This application is a divisional application of and claims priority to U.S. patent application Ser. No. 14/840,984, which is entitled "System For Using Optical Sensor Focus To Identify Feature Heights On Objects Being Produced In A Three-Dimensional Object Printer," which was filed on Aug. 31, 2015, and which issued as U.S. Pat. No. 10,005,229 on Jun. 26, 2018.

TECHNICAL FIELD

The system and method disclosed in this document relates to printers that produce three-dimensional objects and, more particularly, to accurate measurement of features on such objects in these printers.

BACKGROUND

Digital three-dimensional manufacturing, also known as digital additive manufacturing, is a process of making a three-dimensional solid object from a digital model of virtually any shape. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with three-dimensional object printers that use printheads having inkjets that eject drops of material to form the objects is consistent functionality of the inkjets. During printing of an object, one or more inkjets can deteriorate by ejecting the material at an angle, rather than normal, to the printhead, ejecting drops that are smaller than an inkjet should eject, or by failing to eject any drop at all. If these inkjet deficiencies are sufficiently numerous, they can result in inaccurately formed object features. Once such inaccurately objects are detected, the printed objects are scrapped and restorative procedures are applied to the printheads to restore inkjet functionality. The print job can then be repeated. An apparatus that enables detection of inaccurately formed objects while printing would enable restorative procedures to be applied during object printing so a properly formed object could be produced. In this manner, product yield for the printer is improved and its printing is more efficient.

SUMMARY

A printer that uses the focus of an optical sensor to enable height measurements of object features includes a substrate positioned opposite a material applicator to enable an object to be formed on the substrate with material received from the material applicator, an optical sensor having at least one light source and a plurality of photo detectors arranged in a linear array, the optical sensor being configured to generate data corresponding to an upper surface of the object on the substrate, at least one actuator operatively connected to the optical sensor or the substrate, and a controller operatively connected to the optical sensor and the at least one actuator, the controller being configured to operate the at least one actuator to move the optical sensor or the object to a plurality of distances between the object and the optical sensor to enable the optical sensor to generate image data of features of the object as the optical sensor moves relative to the object across a width or length of the object, and to identify features of the object with reference to the data received from the optical sensor and a focal length of the optical sensor.

A method of operating a printer to measure object feature height measurements includes operating with a controller at least one actuator to move an optical sensor having at least one light source and a plurality of photo detectors arranged in a linear array or an object being formed in the printer on a substrate, the optical sensor being moved relative to the object at a plurality of distances between the object and the optical sensor in a direction perpendicular to a plane formed by a width and a length of the object to enable the optical sensor to generate image data of an upper surface of the object, and identifying with the controller features of the object on the substrate with reference to the image data received from the optical sensor and a focal length of the optical sensor.

BRIEF DESCRIPTION OF THE DRAWINGS

The foregoing aspects and other features of an apparatus or printer uses optical sensor focus length to measure object feature heights during three-dimensional printing are explained in the following description, taken in connection with the accompanying drawings.

DETAILED DESCRIPTION

Figure 1:
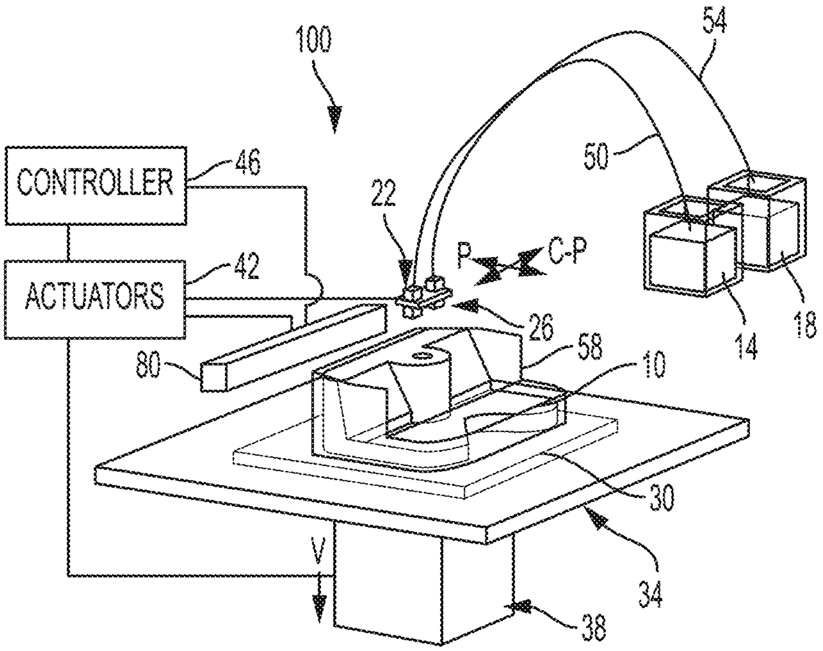
FIG. 1 is a perspective view of a three-dimensional object printer that identifies the heights of object features with an optical sensor.

For a general understanding of the environment for the device disclosed herein as well as the details for the device, reference is made to the drawings. In the drawings, like reference numerals designate like elements.

FIG. 1 shows a configuration of components in a printer 100, which produces a three-dimensional object or part 10. As used in this document, the term "three-dimensional object printer" refers to any device that ejects material with reference to image data of an object to form a three-dimensional object. The printer 100 includes a support material reservoir 14, a build material reservoir 18, a pair of printheads 22, 26, a build substrate 30, a planar support member 34, a columnar support member 38, an actuator 42, and a controller 46. Conduit 50 connects printhead 22 to support material reservoir 14 and conduit 54 connects printhead 26 to build material reservoir 18. Both printheads are operated by the controller 46 with reference to three-dimensional image data in a memory operatively connected to the controller to eject the support and build materials supplied to each respective printhead. The build material forms the structure of the part 10, while the support structure 58 formed by the support material enables the building material to maintain its shape while the material solidifies as the part is being constructed. After the part is finished, the support structure 58 is removed by mechanically breaking, abrading, polishing, etching, washing, blowing, or melting.

The controller 46 is also operatively connected to at least one and possibly more actuators 42 to control movement of the planar support member 34, the columnar support member 38, and the printheads 22, 26 relative to one another. That is, one or more actuators can be operatively connected to structure supporting the printheads to move the printheads in a process direction and a cross-process direction with reference to the surface of the planar support member. The two printheads 22 and 26 can adjoined in a single structure so the two printheads can move in tandem. Alternatively, the two printheads can be separated so they can be moved independently of one another. In some of these embodiments, each printhead 22 and 26 has a single ejector, while in other of these embodiments, each printhead 22 and 26 has multiple ejectors. Alternatively, one or more actuators are operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction occurs with one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction. Although the discussion of an optical sensor 80 and the controller 46 is presented below with reference to printer 100, the sensor and controller can be used in other three-dimensional object printers. For example, the sensor 80 and the controller 46 configured to process the image data received from optical sensor can be used in three-dimensional printers that use extrusion, laser sintering, or powder beds to form three-dimensional objects.

Figure 2:
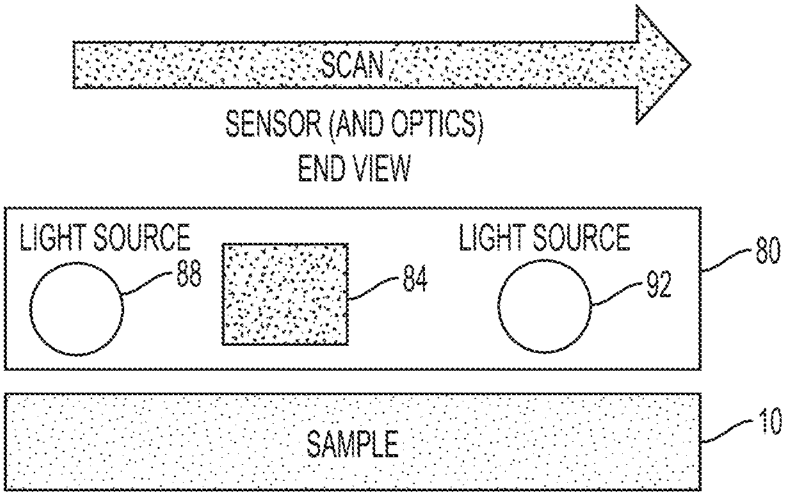
FIG. 2 is a perspective view of an optical sensor moving across an object to measure heights for features of an object in the three-dimensional object printer of FIG. 1.

The three-dimensional object printer 100 also includes an optical sensor 80. As shown in FIG. 2, the optical sensor 80 includes a pair of light sources 88, 92 and a plurality of photo detectors arranged in a linear array 84. As depicted in the figure, the light sources 88 and 92 are parallel to the photo detector array 84 and extend into the page of the figure as does the array. Such sensors are sometimes called linear arrays, although the array is not necessarily strictly one dimensional. As known in the art, the photo detectors of the linear array can be configured in a staggered fashion with small offsets between groups of photo detectors that provide an array that extends in primarily one direction. Also, sensors configured as linear arrays can have multiple closely-spaced rows of photo detectors that have filters, which enable individual photo detectors to generate signals of different amplitudes for different colors. The optics of the sensor may or may not magnify the image so the image data is the same or greater than the cross-process resolution of the photo detectors in the sensor. In one embodiment, the light sources are white light sources, although the two light sources can be colors different than white and different from one another. The optical sensor 80 is operatively connected to the actuators 42 to enable the controller 46 to move the sensor bi-directionally vertically and bi-directionally in the scan or process direction. Alternatively, as noted above, the platform on which the object is formed can be operatively connected to the actuators 42 to enable the controller 46 to move the platform and object bi-directionally vertically and bi-directionally in the scan or process direction and is perpendicular or close to perpendicular to the axis of the linear array sensor. The ability to move the sensor vertically enables the photo detectors of the optical sensor to generate image data signals of the object 10 at different vertical distances from the object 10 with regard to the focal distance of the sensor. By varying the heights of the sensor scans over the object 10, the controller 46 can identify heights of features on the object 10 above the substrate 34 and compare the identified heights to the expected height of the features and to heights of the features previously identified by the controller. The controller can then adjust operation of the printer to compensate for differences detected from the comparison. As used in this document, the term "move relative to the object" refers to the optical sensor or the object being moved across a plane parallel to the upper surface of an object being formed in the printer or to the object being moved across a plane parallel to the upper surface of the object. The sensor may also be scanned in various directions by rotating the sensor or the object, which is especially useful for illuminating the object from additional angles.

FIG. 2 depicts the sensor 80 passing in the process direction over the surface of an object 10. In the process described below, the sensor 80 passes over the surface of the object 10 at a first height. As the sensor passes over the surface, the light sources 88, 92 of the sensor 80 direct light onto the surface of the object 10. The surface reflects or scatters the light depending upon the relative flatness of the surface that the light hits. Each photo detector in the sensor generates an electrical signal that is proportional to the amplitude of the light received by the photo detector. Analog-to-digital (A/D) circuits in the sensor convert the electrical signals received from the photo detectors of the sensor 80 into digital values and the controller 46 receives these digital values. The controller 46 stores these digital values in a memory operatively connected to the controller. The controller 46 then operates one or more actuators 42 to move the sensor vertically and then operates one or more actuators 42 to move the sensor in a direction opposite to the process direction across the surface of the object 10. As the sensor 80 moves, it generates electrical signals corresponding to the light received from the surface of the object 10 and the A/D circuits convert these signals into additional digital values for the new height of the sensor 80 over the surface of the object 10. The controller 46 operates the actuators 42 a plurality of times to obtain a plurality of digital values for each height of the sensor 80.

Figure 3:
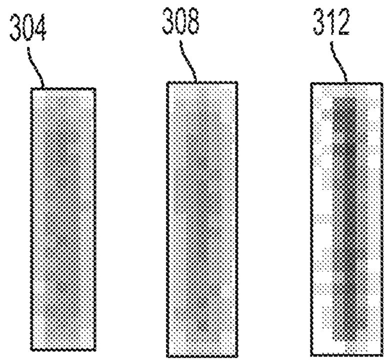
FIG. 3 depicts views of a portion of an object that are produced by the optical sensor of FIG. 2 at different heights over the object.
Figure 4:
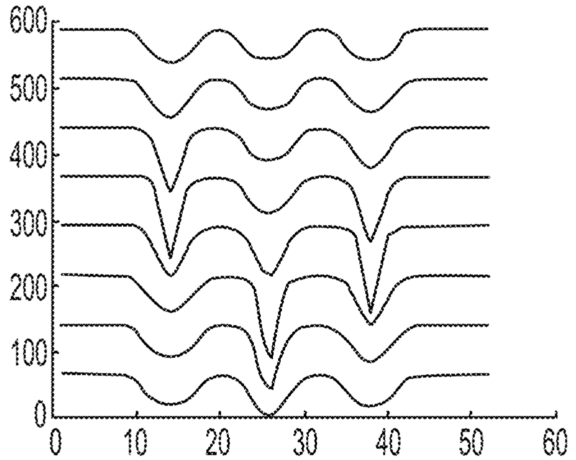
FIG. 4 is a graph of a series of profiles through the three images of FIG. 3 at different heights above the object.

The images 304, 308, and 312 in FIG. 3 correspond to a portion of the surface of the object 10. The image 304 corresponds to the digital values obtained from the sensor 80 at a first height, while the image 308 corresponds to the digital values obtained from the sensor at a second height, and the image 312 corresponds to the digital values obtained from the sensor at a third height. By comparing the digital values for these three images, the controller can extract the height of the features represented by the data at each pixel with reference to the focal distance of the sensor that generated the signals for the digital values. By also identifying the pixels that have an amplitude that reaches an extrema at a particular height of the sensor, the controller 46 can determine when those features are located at the focal distance from the sensor. By comparing this focal distance to the height of the sensor, the controller can determine the height of the feature above the substrate 34. The controller can then compare the identified heights of features to the heights of the features expected from the operation of the printer to that time. Features that have less material than expected can be corrected by operating a material supplier, such as the ejectors 22, 26 in the printer 100, to add material to the features. Features that are larger than expected can be corrected by operating a leveler (not shown) to remove material from the features. FIG. 4 shows the profiles through the digital values of the images shown in FIG. 3 and these profiles show the amplitudes that can be used in the analysis described in this paragraph. In the graph of FIG. 4, the vertical axis represents a positive and increasing amount of reflectance and the horizontal axis represents a positive and increasing amount of pixels, which in one embodiment each pixel is 42.3 microns wide.

Reflection of light from a linear light source, such as source 88 and 92, at some angle highlights features of the captured images at the specular angle to the sensor. "Specular reflections" are those light rays that are reflected from a surface at an angle that is equal to the angle of incidence. These specular reflections are not a significant component in sensors in which optical detectors have different depths of focus, but these specular reflections are extremely useful in surface reconstruction with photo detectors having a fixed focus. As the distance between the photo detectors in the sensor and the object surface increase, the specular reflections in the image not only blur, but they change angle as well. Additionally, light sources oriented at different angles enable the collection of additional information. For example, by rotating the sensor 80 so light sources on each side of the sensor direct light towards the object surface at different angle, different specular reflections are produced and these can be used to enhance surface reconstruction. In some embodiments, different colors of light are emitted from each light source so that the image data generated during a single sensor scan can distinguish the light received from each source and the effects of occlusion of lighting from each angle.

Scattered light can also be used in the reconstruction of object feature shapes. First, the pixels dominated by the much brighter specular reflections are removed. Then the rest of the pixels from the images measured at various heights as being appropriately blurred with reference to the distance of each point of the part from the focus of the sensor. De-convoluting the blur from the actual shape of the part is an inversion problem that is greatly simplified by knowledge of the intended shape. The intended shape is used as the starting point of an iterated process that optimizes the match of the approximated assumed shape as blurred to the measured images using a metric, such as the least squares of the difference. This initial knowledge can be the intended shape of the object as well as any prior measurements including the specular measurements discussed above as well as prior measurements of the part in earlier portions of the build process combined with the intended subsequent material deposition. In addition, known properties of the build process and the build materials limit the range of possible texture for the part and simplify the de-convolution, which helps eliminate noise in the image data of the structure at frequencies outside the range of possibilities for the actual 3D construction process. Use of previous measurements is especially valuable to reduce complications caused by the translucency of the materials.

Figure 5:
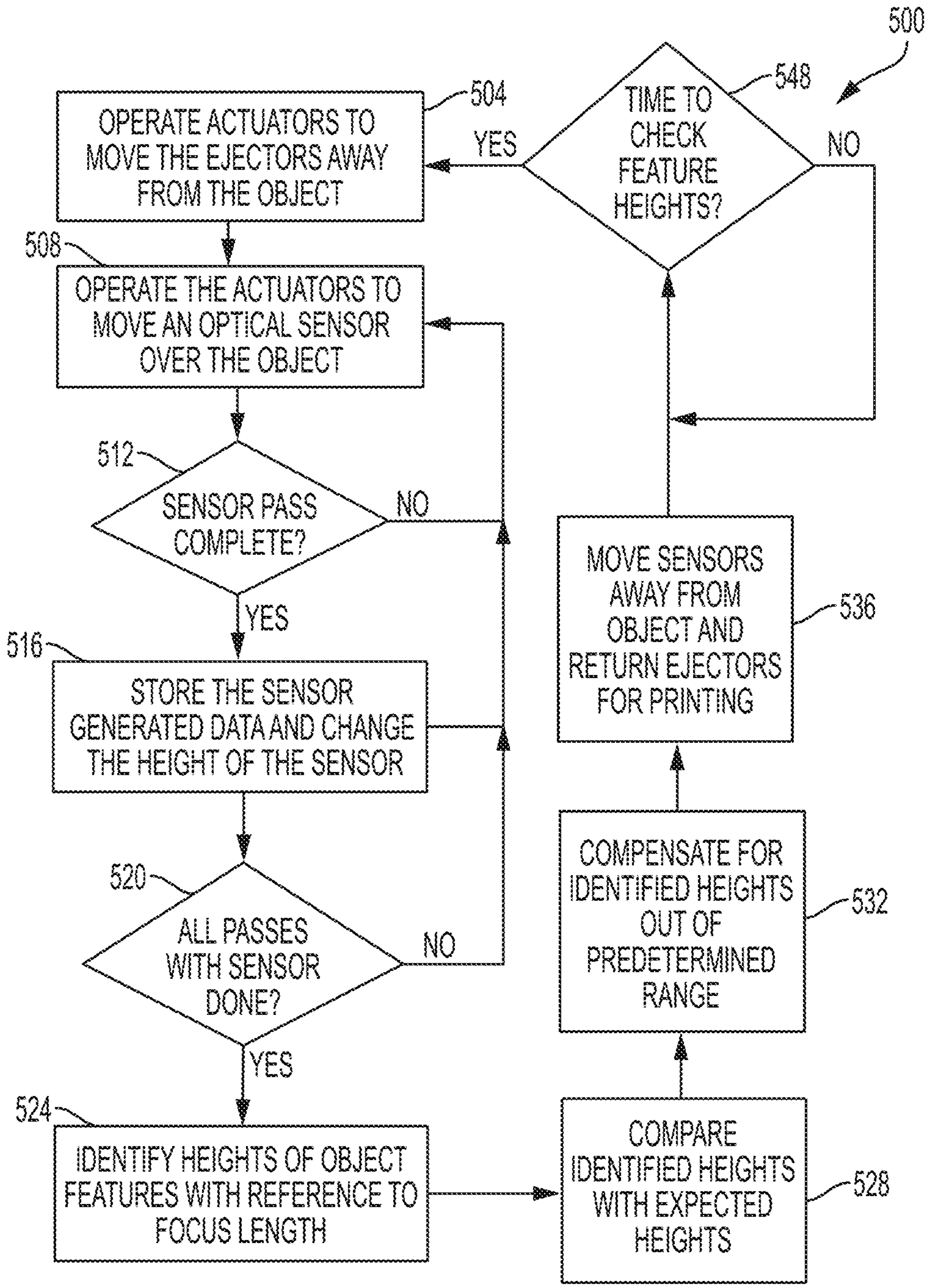
FIG. 5 is a flow diagram of a method for operating the optical sensor of FIG. 2.

A method 500 of operating a printer that produces three-dimensional objects is shown in FIG. 5. In the description of this method, statements that a process is performing some task or function refers to a controller or general purpose processor executing programmed instructions stored in a memory operatively connected to the controller or processor to manipulate data or to operate one or more components in the printer to perform the task or function. The controller 46 noted above can be such a controller or processor. Alternatively, the controller 46 can be implemented with more than one processor and associated circuitry and components, each of which is configured to form one or more tasks or functions described herein.

At predetermined times in the operation of printer 100, the controller 46 (FIG. 1) operates actuators 42 to move the ejectors 22, 26 from the plane above the object 10 so the sensor 80 can pass over the object (block 504). The controller then operates the actuators 42 to move the sensor 80 over the object while the light sources 88, 92 in the sensor directs light onto the upper surface of the object and the photo detectors 84 of the sensor generate image data of a portion of the object (block 508). Once the sensor has completed the pass (block 512), the controller stores the data and operates the actuators 42 to change the vertical distance between the sensor and the object (block 516). The controller determines if the predetermined number of sensor passes has occurred (block 520). If additional passes need to be made with the sensor, the controller moves the sensor across the surface of the object 10 in the opposite direction to generate additional image data of the object surface (blocks 508 and 512) and these data are also stored in memory (block 516). Once the predetermined number of passes with the sensor has been reached (block 520), the process identifies the heights of the object features as described above using the image data generated by the sensor 80 (block 524) and compares these heights to the expected feature heights (block 528). Any differences outside of a predetermined range are used to compensate for the discrepancy by depositing more or less material or by adjusting operation of a leveler, which is used to remove material from the part (block 540). If unwanted variations in part height are greater than the amount of material removed by the leveler then the leveler can be adjusted to remove more material and thereby reduce unwanted variations in part height. Then, the controller 46 moves the sensor 80 away from the object 10 and the ejectors 22, 26 are returned to positions above the object to further manufacture the object (block 544). The process of FIG. 5 is performed from time to time (block 548) during the manufacture of the object until the manufacture of the object is completed.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method of operating a printer comprising:

operating with a controller at least one actuator to move an optical sensor having at least one light source and a plurality of photo detectors arranged in a linear array opposite an object being formed in the printer on a substrate, the optical sensor being moved relative to the object at a plurality of distances between the object and the optical sensor in a direction perpendicular to a plane formed by a width and a length of the object to enable the optical sensor to generate image data of an upper surface of the object; and identifying with the controller features of the object on the substrate with reference to the image data received from the optical sensor and a focal length of the optical sensor.

2. The method of claim 1 further comprising:

identifying with the controller distances of the features of the object from the substrate with reference to the image data generated by the optical sensor; and comparing with the controller the identified distances of the features to data corresponding to expected distances of the features of the object above the substrate.

3. The method of claim 2 further comprising:

adjusting operation of the printer with the controller in response to a difference between the identified distances of the features of the object above the substrate and the expected distances of the features being greater than a predetermined threshold.

4. The method of claim 1 further comprising:

operating with the controller the at least one actuator to move the optical sensor or the object bi-directionally.

5. The method of claim 4, the operation of the at least one actuator further comprising:

operating with the controller the at least one actuator to move the optical sensor or the object bi-directionally in a vertical direction.

6. The method of claim 5, the operation of the at least one actuator further comprising:

operating with the controller the at least one actuator to move the optical sensor bi-directionally in a scan or process direction.

7. The method of claim 1 further comprising:

operating with the controller the at least one actuator to position the optical sensor at the plurality of distances between the object and the optical sensor with reference to the focal length of the optical sensor.

8. The method of claim 1 further comprising:

operating with the controller the light source of the optical sensor to direct white light oriented with reference to the substrate to illuminate a field of view of the photo detectors of the optical sensor.

9. The method of claim 1 further comprising:

operating with the controller the at least one light source of the optical sensor to direct light from a pair of light sources oriented with reference to the substrate to illuminate a field of view of the photo detectors of the optical sensor.

10. The method of claim 9 further comprising:

operating with the controller a first light source of the optical sensor to emit light of a first color;

operating with the controller a second light source of the optical sensor to emit light of a second color, the first color and the second color being different; and detecting the first color and the second color with the controller from the image data generated by the plurality of photo detectors in the optical sensor.

11. The method of claim 1 further comprising:

identifying the height of object features with the controller from image data generated by the plurality of photo detectors in the optical sensor receiving light specularly reflected by the surface of the object.

12. The method of claim 1 further comprising:

operating another actuator with the controller to rotate an orientation of the optical sensor relative to the object and change the specular reflection of the light by the surface of the object.

13. The method of claim 1 further comprising:

identifying the height of object features with the controller from image data generated by the plurality of photo detectors in the optical sensor receiving light scattered by the surface of the object.

14. The method of claim 1 further comprising:

filtering light for each photo detector in the plurality of photo detectors to enable the photo detectors to generate signals having a plurality of amplitudes, each different amplitude corresponding to a different color of light.

15. The method of claim 1 further comprising:

comparing amplitudes of signals generated by the optical sensor to determine a signal corresponding to the focal distance of the optical sensor.

16. The method of claim 15 further comprising:

identifying the signal corresponding to the focal distance of the optical sensor as the signal having a largest amplitude.

* * * * *